United States Patent
Michaud

[19]

[11] Patent Number: 5,831,345
[45] Date of Patent: Nov. 3, 1998

[54] PRIORITY RELAY CIRCUIT WITH TIMER

[75] Inventor: Rogert P. Michaud, Orris Island, Me.

[73] Assignee: Erie Manufacturing Company, Milwaukee, Wis.

[21] Appl. No.: 544,457

[22] Filed: Oct. 18, 1995

[51] Int. Cl.[6] .................................................. H02J 1/00
[52] U.S. Cl. ..................... 307/38; 307/141.4; 307/140; 361/166; 361/170; 361/195; 236/20 R; 236/48 R
[58] Field of Search ................................. 307/38, 39, 41, 307/125, 126, 139, 140, 141, 141.4; 361/160, 166, 169.1, 170, 189, 190, 195, 196; 236/20 R, 46 R

[56] References Cited

U.S. PATENT DOCUMENTS

| | | | |
|---|---|---|---|
| 4,335,320 | 6/1982 | Garver | 307/39 |
| 4,410,135 | 10/1983 | Skyinskus | 237/8 R |
| 4,564,141 | 1/1986 | Montgomery et al. | 236/20 R |
| 5,191,520 | 3/1993 | Eckersley | 363/72 |
| 5,384,490 | 1/1995 | Swartz, Jr. | 307/38 |
| 5,396,395 | 3/1995 | Taninizu | 361/166 |
| 5,508,878 | 4/1996 | Pecore | 361/195 |
| 5,626,287 | 5/1997 | Krause et al. | 236/20 R |

*Primary Examiner*—Jeffrey A. Gaffin
*Assistant Examiner*—Jonathan S. Kaplan
*Attorney, Agent, or Firm*—Terrence Martin; Sean Detweiler; Andrew McConnell

[57] ABSTRACT

A priority control system is disclosed for controlling multiple secondary load devices, and one priority load device. The secondary load devices can be randomly controlled at any time, except when the priority load device is activated, in which case, all secondary load devices are deactivated. The priority control system has a first relay which relays power to a plurality of secondary relays corresponding to the secondary load devices. The first relay is biased such that it normally provides power to the secondary relays. The first relay also has a priority position which is the non-biased position, for providing power to the priority load device. The first relay is activated by a priority control device which switches system power from the secondary relays to the priority load device. A priority timer circuit is provided to limit the time the first relay is in the priority position, regardless of a possible malfunction in the priority control device. This prevents a failure of the entire system in the event of a failure to the priority control or load devices.

18 Claims, 3 Drawing Sheets

PRIORITY RELAY CIRCUIT WITH TIMER

BACKGROUND OF THE INVENTION

The invention relates to electrical priority relay circuits, and more particularly to a method and apparatus for limiting the time a priority relay is dedicated to a priority zone.

Priority relay circuits are common in the prior art and are generally used for multiple load device control where one load device has priority over all other load devices. Typically, each load device will have its own dedicated control device, and the relay circuit responds to a request from the control device to supply power to the corresponding load device. In a priority system, when the priority control device makes a request, the priority relay circuit disables all other load devices regardless of all other control device requests, and supplies power solely to the priority load device.

However, if a malfunction occurs in the priority control device, or in the priority load device, the priority relay circuit could become locked in the priority mode and deprive the remaining load devices of power, thereby disabling the entire system. This can be an extreme disadvantage in systems where the secondary load devices provide critical functions. For example, in some hydronic heating systems, the domestic hot water is supplied by an indirect water heater supplied by the same water heating boiler that supplies the source of heat for the entire building. The building may be divided into heating zones in which each heating zone includes a heating circulator and an individual thermostat. Because of heat fluctuations in buildings, any single heating zone, or any combination of heating zones, may be activated at any given time and are designed to maintain even temperatures in the heating zones. On the other hand, domestic hot water is used sporadically, and each time it is used, the indirect domestic water heater requires replenishment. Because the demand on the domestic hot water heater is less stable than the demand for hot water to the heating zones, a preferred control sequence is to give priority to the domestic hot water heater by deactivating the heating circulators when the temperature of the domestic hot water heater falls below its predetermined setting. In this arrangement, if the aquastat sensing the temperature of the domestic hot water heater is not satisfied for any reason, such as a malfunction of the aquastat or a leak in the tank, the heating system will not thereafter be activated, and the entire building would be without heat and may freeze.

SUMMARY OF THE INVENTION

The present invention overcomes the aforementioned problems, and provides a means for detecting whether the priority zone has not changed for a certain period of time, and cancels the priority zone call if its demand is not satisfied within that time period.

In accordance with one aspect of the invention, a method of preventing secondary system failure in a prioritized system when a failure occurs in a priority zone includes relaying system power to secondary relays of the secondary system through a priority relay of the priority zone, biasing the priority relay to a secondary power position thereby normally supplying power to the secondary relays, switching the priority relay from the secondary power position to a priority power position thereby supplying power to the priority zone in response to a priority control device output, and limiting the switching time of the priority relay to either a predetermined time or until the detection of a change from the priority control device output. When the priority relay is returned to its secondary power position, system power is returned to the secondary relays.

In a preferred embodiment, the method is applied to a zoned hydronic heating system that prioritizes one zone over all other zones, and the method prevents the system from freezing when a malfunction occurs in the priority zone by providing heat to the other zones when the predetermined time expires when the priority relay is in the priority power position.

In accordance with another aspect of the invention, a relay circuit includes a first relay switch connecting a power source to a priority load device and controlled by a priority control device, a secondary relay switch connected between the first relay switch and a secondary load device and controlled by a secondary control device, and a priority timer circuit connecting the priority control device and the first relay switch. The priority timer circuit is activated by the priority control device and switches the first relay switch for a predetermined period of time, thereby energizing the priority load device for a time no longer than the predetermined time period.

The present invention also contemplates an improvement to a hydronic heating system having a water heating boiler, an indirect domestic water heater, a plurality of heating circulators controlling hot water from the boiler to a plurality of heating zones, a plurality of corresponding thermostats monitoring the heating zones, a priority circulator controlling hot water from the boiler to the indirect domestic water heater, and an aquastat monitoring the indirect domestic water heater. In accordance with this aspect of the invention, a control circuit has a priority relay connected to a power source and the priority circulator. A plurality of secondary relays are connected to the priority relay and to corresponding heating circulators and thermostats. A priority timer circuit is connected to the priority relay and the aquastat. When the aquastat requests hot water to the indirect domestic water heater, the priority timer circuit switches the priority relay for a predetermined time period and activates the priority circulator. The secondary relays are disabled and hot water is provided only to the indirect domestic water heater. When either the aquastat request is satisfied or the priority timer circuit expires, whichever occurs first, the priority relay enables the secondary relays thereby permitting hot water to the heating zones in response to requests from the corresponding thermostats for each zone.

Various other features, objects, and advantages of the invention will be made apparent from the following detailed description and the drawings.

BRIEF DESCRIPTION OF THE DRAWINGS

The drawings illustrate the best mode presently contemplated for carrying out the invention. In the drawings.

DETAILED DESCRIPTION OF THE PREFERRED EMBODIMENT

Figure 1:
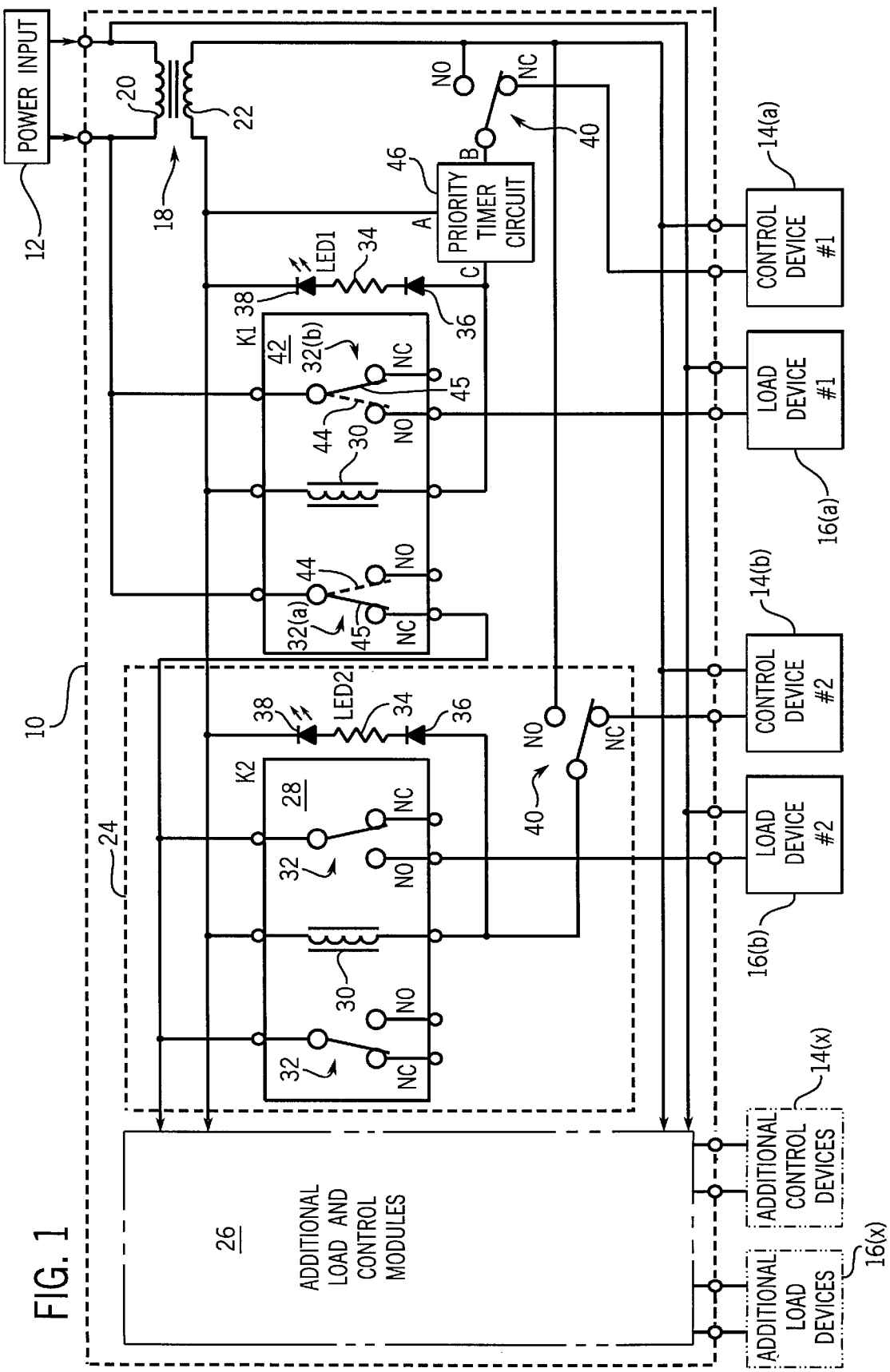
FIG. 1 is a block diagram of a priority relay circuit in accordance with the present invention.

FIG. 1 shows, in general block diagram form, a relay circuit for use in a priority system. A priority system is defined as any system having at least two control devices and load devices wherein one control device and load device take operational precedent over the others.

As shown in FIG. 1, a relay circuit 10 has a power supply input 12 and multiple control devices 14 and load devices 16. In the embodiment shown, control device and load device #1, 14(a) and 16(a), respectively, represent a zone having priority over all others.

Relay circuit 10 has a transformer 18 with primary windings 20 and secondary windings 22. In the preferred embodiment, the power supply input 12 is a 110/120 VAC supply with the transformer 18 producing a 24 VAC source from the secondary winding 22.

Relay circuit 10 has at least one load and control module 24, but preferably has a plurality of additional load and control modules 26. Preferably, each load and control module will be similarly constructed, and the following description of load and control module 24 generally applies to each of the additional load and control modules 26.

Load and control module 24 has a relay switch assembly 28 having a relay coil 30 and at least one relay switch 32. In this embodiment, relay switch assembly 28 has a pair of relay switches 32. Relay coil 30 is connected in parallel with resistor 34, flyback diode 36, and LED 38. Flyback diode 36 prevents reverse current through LED 38 when coil 30 is de-energized.

An optional test switch 40 is provided in each of the load and control modules 24, 26 to disconnect the corresponding control device 14 from the corresponding relay switch assembly 28, and connect the relay switch assembly 28 directly to transformer 18, thereby energizing the respective load device 16. The test switch 40 is used in troubleshooting the system by isolating the control device 14, and directly energizing the relay switch assembly 28 to supply primary power to the load device 16. The test switch 40 is particularly useful where the control device 14 is an electronic thermostat. Past practice was to short the leads of the control device (thermostat) to energize the relay switch assembly 28, but such shorting, without removal of the thermostat from the circuit, can result in permanently damaging electronic thermostats. A relay circuit having such a test switch and a method of testing the relay circuit are fully set forth in my prior U.S. patent application Ser. No. 08/329,424, filed Oct. 27, 1994, incorporated herein by reference.

The relay circuit 10 has a priority relay switch assembly 42 connecting the power source 12 to a priority load device 16(a). The priority relay switch assembly 42 also relays power to at least one load and control module 24. Preferably, the priority relay switch assembly 42 relays power to a plurality of additional load and control modules 26 in addition to load and control module 24. Priority relay switch assembly 42 has two relay switches 32 which are biased toward a normally closed terminal (NC). One of the relay switches, shown at 32(a), is used to relay power from the power supply 12 to the load and control modules 24, 26, while the other relay switch, shown at 32(b), is used to relay power from the power supply 12 to the priority load device 16(a) when the priority relay switch assembly 42 has its relay coil 30 energized to bring the relay switches 32 to a priority position 44. Alternatively, a single relay switch 32 can be used with the priority load device connected to the normally open terminal (NO), and the plurality of load and control modules 24, 26 connected to the normally closed terminal (NC). The biased position 45 is also referred to as a secondary power position.

A priority timer circuit 46 connects the priority control device 14(a) and the priority relay switch assembly 42. The priority timer circuit 46 detects whether the priority control device 14(a) has not changed for a certain period of time, and thereafter de-energizes the priority load device 16(a) and enables the other load and control modules 24, 26. An optional test switch 40 is incorporated between the priority control device 14(a) and the priority relay switch assembly 42, in accordance with the aforementioned Ser. No. 08/329,424 patent application.

Figure 2:
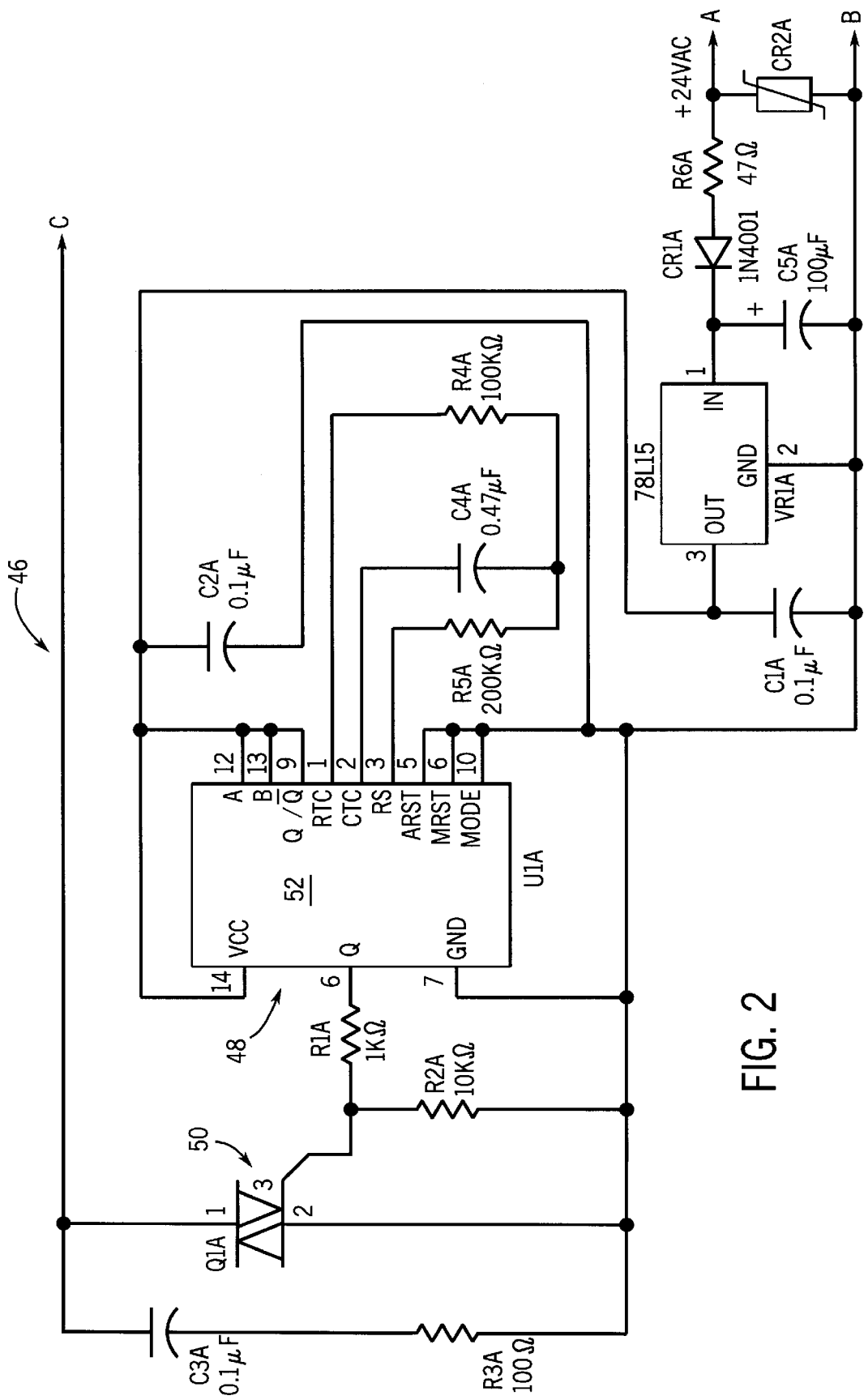
FIG. 2 is a circuit schematic of a priority timer circuit employed in the circuit of FIG. 1.

FIG. 2 shows a circuit schematic of a preferred embodiment of the priority timer circuit 46. The priority timer circuit 46 comprises a priority timer 48 and a priority switch 50, wherein the priority timer 48 is activated in response to the priority control device 14(a), FIG. 1, calling for power to the priority load device 16(a). The priority timer 48, FIG. 2, activates the priority switch 50 thereby energizing the priority load device 16(a), FIG. 1, for a predetermined time as established by the priority timer 48.

In the preferred embodiment, priority switch 50 is a triac that closes the circuit between the priority relay switch assembly 42 and the priority control device 14(a) in response to the output Q of the priority timer 48 going high. Priority timer 48 comprises a programmable timer 52 configured in a one-shot digital timer application and having a frequency dependent on resistors R4A, R5A, and capacitor C4A. An example of such a programmable timer is a Motorola MC 14541B, and in the preferred embodiment, the RC network shown in FIG. 2 provides a frequency of approximately 9.25 Hz which results in the Q output remaining high for approximately one hour. The count time can readily be varied by changing the RC network, and/or using the time select inputs A and B. The programmable timer 52 is connected in a standard configuration and further application information is readily available from the manufacturer.

Noise suppression and half wave rectification is provided to DC power supply VR1A by varistor CR2A, resistor R6A, diode CR1A, and capacitor C5A. The DC power supply VR1A may illustratively be a Motorola 78L15. Capacitors C1A and C2A provide noise filtering in the DC supply to the programmable timer 52. Resistors R1A and R2A form a voltage divider to supply the triac 50 with a suitable turn-on voltage. Capacitor C3A and resistor R3A assist in providing a quicker turn-off time for triac 50.

Figure 3:
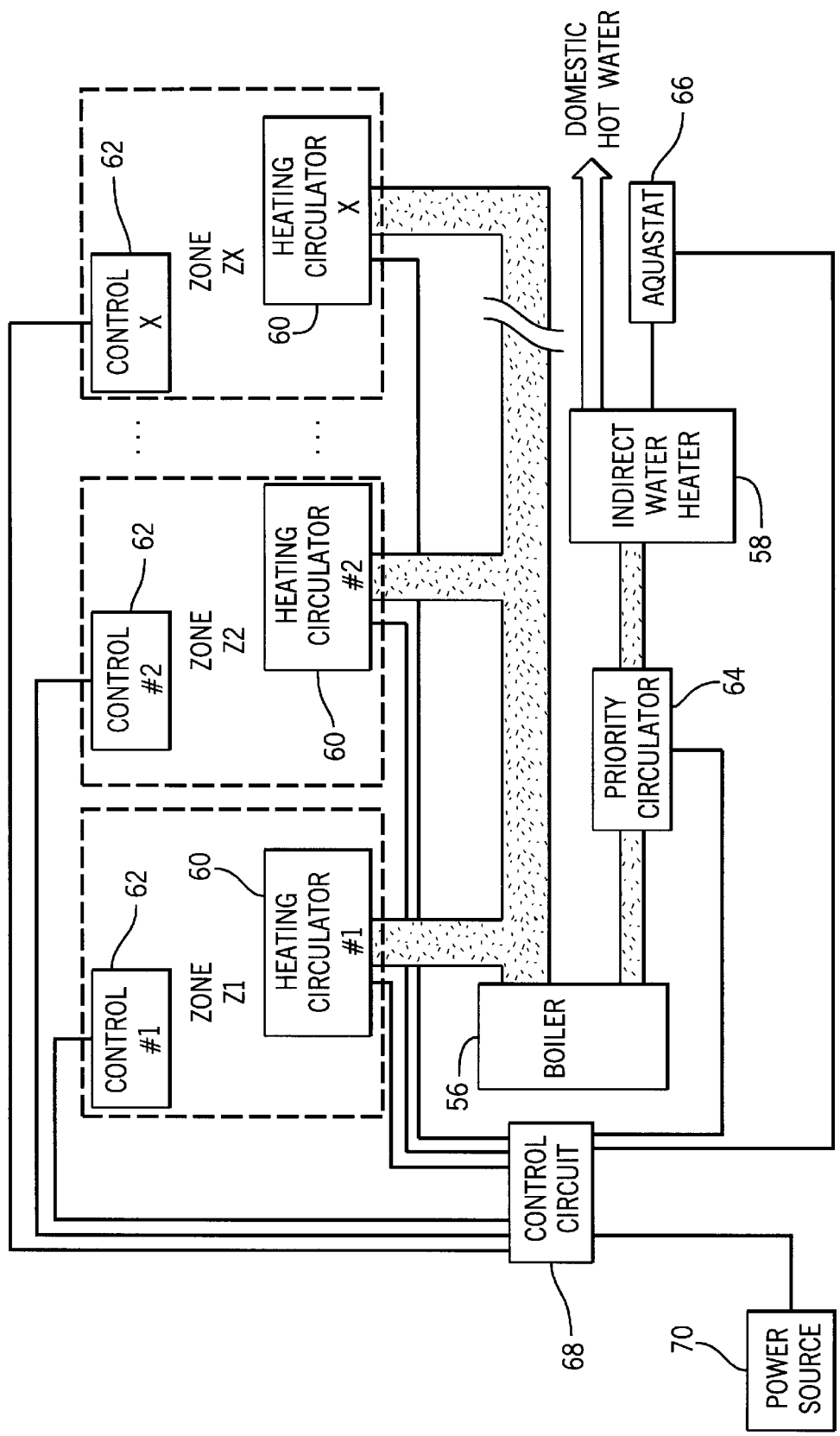
FIG. 3 is a block diagram of a heating system incorporating the present invention.

FIG. 3 shows a hydronic heating system 54 having a water heating boiler 56 and an indirect domestic water heater 58. The boiler 56 supplies hot water to the indirect water heater 56, and to a plurality of heating zones Z1, Z2, . . . Zx. In each heating zone, there exists a heating circulator 60 for controlling the supply of hot water from the boiler 56 in response to a corresponding thermostat 62 within each heating zone. The heating circulators 60 are akin to the load devices 16(b), 16(x) of FIG. 1. The thermostats 62, FIG. 3, are akin to the control devices 14(b), 14(x) of FIG. 1.

A priority domestic water circulator 64 controls water flow to the indirect water heater 58. An aquastat 66 monitors the temperature of the water in the indirect domestic water heater 58. Priority circulator 64 is akin to priority load device 16(a) of FIG. 1, and aquastat 66 is akin to the priority control device 14(a) of FIG. 1. A control circuit 68 is connected to a power source 70, to each of the thermostats 62, to each of the heating circulators 60, to the priority circulator 64, and to the aquastat 66. The control circuit 68 comprises a relay circuit 10, FIG. 1, having the priority timer circuit 46 of FIG. 2.

In a typical priority hydronic heating system in which both the domestic hot water and the heating system hot water are supplied by the same source, the preferred control sequence is to give priority to the domestic hot water heater 58 by deactivating the zone heating circulators 60 when the aquastat 66 for the domestic hot water heater falls below its predetermined setting. Each heating zone Zx is controlled by its own thermostat 62 which directs the control circuit 68 to provide hot water to the heating zone Zx through heating circulators 60. Each zone is independently controlled and any combination of heating circulators 60 may be activated at any given time. However, when the aquastat 66 senses a low temperature in the indirect water heater 58, the aquastat and the priority circulator 64 take priority over the zoned heating system. When the aquastat 66 senses the water temperature in the indirect water heater 58 has fallen below a given threshold, the aquastat 66 provides a signal to the control circuit 68 to request hot water from the boiler 56 to the indirect domestic water heater 58 through priority circulator 64. The rest of the system is temporarily disabled.

This is accomplished by the aquastat 66 signaling the control circuit 68 which comprises the relay circuit 10 of FIG. 1. The priority timer circuit 46 switches the priority relay switch assembly 42 for a predetermined time, activating the priority circulator 64 and disabling the secondary relay switch assemblies 28. This provides hot water flow only to the indirect domestic water heater 58 through priority circulator 64. When the first of either the aquastat 66 is satisfied, or the priority timer circuit 46 expires, the priority relay switch assembly enables the secondary relay switch assemblies 28 thereby permitting hot water to the heating zones based on the corresponding thermostats 62, and deactivates the priority circulator 64.

The present invention therefore prevents a malfunction in the priority zone, in this case the indirect water heater, from disabling the entire system. For example, in the hydronic heating system of FIG. 3, the present invention will prevent a malfunction in the indirect water heater 58 or aquastat 66 from disabling the entire zoned heating system and thereby prevent the heating zones from freezing.

The present invention also encompasses the method of preventing secondary system failure in a prioritized system when a priority control device for a priority zone fails. Referring to FIG. 1, the method comprises the steps of relaying system power 12 to secondary relays 28 of the secondary system through a priority relay 42 of the priority zone, and biasing the priority relay 42 to a secondary power position thereby normally supplying power to the secondary relays. The method further comprises the step of switching the priority relay 42 from the secondary power position to a priority power position 44 thereby supplying power to the priority zone in response to a priority control device 14(a) output, wherein the time of switching is limited to either a predetermined time or a change from the priority control device output, which thereby permits the system power to return to the secondary relays and preventing failure to the secondary system of the prioritized system.

While the invention has been described specifically with reference to a hydronic water heating and supply system, it is understood that the invention may be employed in any type of system utilizing a prioritized demand control arrangement.

The component part numbers specified herein are for illustrative purposes only, and may be replaced with other comparable component parts. It is also recognized that other equivalents, alternatives, and modifications aside from those expressly stated, are possible and within the scope of the appended claims.

I claim:
1. A relay circuit comprising:
a power source;
a first relay switch operable between a first and a second position;
a secondary relay switch connected to the first relay switch, the secondary relay switch being connected to the power source when the first relay switch is in the first position;
at least one secondary load device connected to the secondary relay switch;
a secondary control device connected to the secondary relay switch to operate the secondary relay switch between a first and a second position, such that power is supplied to the secondary load device only when the secondary relay switch is in the first position and the first relay switch is in the first position;
a priority load device connected to the first relay switch, the priority load device being connected to the power source when the first relay switch is in the second position;
a priority control device connected to the first relay switch, the priority control device controlling the position of the first relay switch; and
a priority timer circuit interposed between the priority control device and the first relay switch, wherein the priority timer circuit is activated by the priority control device and switches the first relay switch to the second position for a predetermined period of time, wherein the priority timer circuit energizes the priority load device and deenergizes the secondary relay switch for the predetermined time period and, upon expiration of the predetermined time period, automatically returns the first relay switch to the first position to deenergize the priority load device and energize the second relay switch.

2. The relay circuit of claim 1 wherein the priority timer circuit comprises a priority timer and a priority switch, wherein the priority timer is activated by the priority control device and activates the priority switch thereby energizing the priority load device for a time no longer than the predetermined time period.

3. The relay circuit of claim 2 wherein the priority switch comprises a triac.

4. A priority control system for controlling at least one secondary load device and one priority load device comprising:
a first relay means for relaying power to at least one secondary relay means when in a biased position, and to a priority load device when in a priority position;
a priority control device connected between the first relay means and the priority load device, the priority control device operating the first relay means between the priority position and the biased position based on the status of the priority load device, wherein when the priority load device requires power, the first relay means disconnects power to the secondary relay means and connects power to the priority load device; and
a priority timer means connected to the first relay means for limiting the time the first relay means is in the priority position, wherein the priority timer means returns the first relay means to the biased position after a predetermined period of time during which the priority load device requires power to return power to the secondary relay means subsequent to the predetermined period of time.

5. The priority control system of claim 4 wherein the priority timer means comprises a switching means and a timer means, the timer means being activated by a priority control device and closing the switching means for a predetermined time, and the switching means closing the circuit between a power source and the relay means.

6. The priority control system of claim 4 further comprising at least one secondary load device corresponding to the secondary relay means, and wherein the priority timer means allows the first relay means to return to the biased position and relay power to the secondary load device through the secondary relay means if the first relay means is in the priority position longer than a predetermined time.

7. The priority control system of claim 4 further comprising a means for disconnecting the priority control device from the first relay means and connecting the first relay means directly to a power source.

8. The priority control system of claim 4 further comprising a secondary control device activating the secondary relay means, and a means for disconnecting the secondary control device from the secondary relay means and connecting the secondary relay means directly to a power source.

9. A method of preventing secondary system failure in a prioritized system when a failure occurs in a priority zone, comprising the steps of:

relaying system power to at least one secondary relay of the secondary system through a priority relay of the priority zone;

biasing the priority relay to a secondary power position thereby normally supplying power to the secondary relay;

switching the priority relay from the secondary power position to a priority power position thereby supplying power to the priority zone in response to a priority control device output;

monitoring the amount of time the priority relay is in the priority power position; and overriding the priority control device output when the priority relay is in the priority power position longer than a predetermined period of time, such that the priority relay returns to the secondary power position to supply power to the secondary relays after the predetermined period of time.

10. The method of claim 9 wherein the prioritized system is a zoned hydronic heating system that prioritizes one zone over other zones, and the method prevents the system from freezing when a malfunction occurs in the priority zone, and further comprises the step of heating the other zones when the predetermined time expires.

11. A relay circuit comprising:

a first relay switch connecting a power source to a priority load device and controlled by a priority control device, the first relay switch having a normally open terminal and a normally closed terminal, the priority load device being connected to the normally open terminal;

a secondary relay switch connected between the first relay switch and a secondary load device and controlled by a secondary control device, the secondary relay switch being connected to the normally closed terminal of the first relay switch; and a priority timer circuit connecting the priority control device and the first relay switch, wherein the priority timer circuit is activated by the priority control device and switches the first relay switch for a predetermined period of time, thereby energizing the priority load device for a time no longer than the predetermined time period.

12. The relay circuit of claim 11 wherein the priority control device selectively switches the first relay switch from the normally closed terminal to the normally open terminal until either the priority control device selectively switches the first relay from the normally open terminal to the normally closed terminal or the priority timer circuit expires.

13. The relay circuit of claim 11 wherein a plurality of secondary relay switches are connected to the normally closed terminal of the first relay switch and to a corresponding plurality of load devices, and wherein the switching of the first relay switch disables the plurality of secondary relay switches.

14. A relay circuit comprising:

a first relay switch connecting a power source to a priority load device and controlled by a priority control device;

a secondary relay switch connected between the first relay switch and a secondary load device and controlled by a secondary control device;

a test switch connected between the priority control device and the first relay switch; and a priority timer circuit connecting the priority control device and the first relay switch, wherein the priority timer circuit is activated by the priority control device and switches the first relay switch for a predetermined period of time, thereby energizing the priority load device for a time no longer than the predetermined time period.

15. The relay circuit of claim 14 further comprising a plurality of test switches, each test switch connected between a control device and a secondary relay switch.

16. A hydronic heating system including a boiler for supplying heated water to a plurality of heating zones and an indirect water heater, the system comprising:

a plurality of heating circulators controlling the flow of hot water from the boiler to the plurality of heating zones;

a plurality of thermostats positioned to monitor the heating zones;

a priority circulator for controlling the flow of heated water from the boiler to the indirect water heater;

an aquastat for monitoring the indirect water heater and providing a signal when the temperature of the water in the indirect water heater falls below a predetermined value; and a control circuit connected to the aquastat, the priority circulator and the plurality of heating circulators and including a timing arrangement;

wherein upon receiving the signal from the aquastat, the control circuit activates the priority circulator to supply heated water to the indirect water heater and deactivates the plurality of heating circulators during activation of the priority circulator, and wherein the control circuit reactivates the plurality of heating circulators if the signal from the aquastat that activated the priority circulator endures for a time exceeding a predetermined time period.

17. A hydronic heating system including a boiler for supplying heated water to a plurality of heating zones and an indirect water heater, the system comprising:

a plurality of heating circulators controlling the flow of hot water from the boiler to the plurality of heating zones;

a plurality of thermostats positioned to monitor the heating zones;

a priority circulator for controlling the flow of heated water from the boiler to the indirect water heater;

an aquastat for monitoring the indirect water heater and providing a signal when the temperature of the water in the indirect water heater falls below a predetermined value; and a control circuit connected to the aquastat, the priority circulator and the plurality of heating circulators and including a timing arrangement;

wherein upon receiving the signal from the aquastat, the control circuit is operable to activate the priority circulator to supply heated water to the indirect water heater and to deactivate the plurality of heating circulators during activation of the priority circulator, and wherein the control circuit is operable to reactivate the plurality of heating circulators if the signal from the aquastat that activated the priority circulator endures for a time exceeding a predetermined time period, wherein the control circuit includes a priority relay connected to a power source and the priority circulator and a plurality of secondary relays connected to the priority relay and to corresponding heating circulators and thermostats, and wherein the timing arrangement comprises a priority timer circuit connected to the priority relay and the aquastat, wherein when the aquastat requests heated water to the indirect water heater, the priority timer circuit switches the priority relay for a predetermined time period and the priority relay activates the priority circulator and disables the plurality of secondary relays thereby providing heated water only to the indirect water heater, and when the first of either the aquastat request is satisfied or the priority timer circuit expires, the priority relay enables the plurality of secondary relays thereby permitting heated water to the heating zones based on the corresponding thermostats.

18. The hydronic heating system of claim 17 wherein the priority timer circuit comprises a priority timer set to run for a predetermined time period and a priority switch activated by the priority timer to switch the priority relay and activate the priority circulator for no longer than the predetermined time period.

\* \* \* \* \*